(12) United States Patent
Kihara et al.

(10) Patent No.: US 9,048,735 B2
(45) Date of Patent: Jun. 2, 2015

(54) POWER SUPPLY DEVICE AND METHOD OF DETERMINING ABNORMALITY IN POWER SUPPLY DEVICE

(71) Applicants: Nobuhiro Kihara, Chiyoda-ku (JP); Hiroshi Okuda, Chiyoda-ku (JP)

(72) Inventors: Nobuhiro Kihara, Chiyoda-ku (JP); Hiroshi Okuda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 130 days.

(21) Appl. No.: 13/853,574

(22) Filed: Mar. 29, 2013

(65) Prior Publication Data

US 2014/0092652 A1 Apr. 3, 2014

(30) Foreign Application Priority Data

Oct. 1, 2012 (JP) .................................. 2012-219125

(51) Int. Cl.
   *G05F 1/00*    (2006.01)
   *H02M 1/32*    (2007.01)
   *H02M 3/157*   (2006.01)
   *H02M 3/158*   (2006.01)

(52) U.S. Cl.
   CPC ................ *H02M 1/32* (2013.01); *H02M 3/157* (2013.01); *H02M 3/1582* (2013.01)

(58) Field of Classification Search
   CPC ........ H02M 1/32; H02M 3/156; H02M 3/157
   USPC ......... 323/222–225, 271–275, 282–285, 292; 361/18
   See application file for complete search history.

(56) References Cited

U.S. PATENT DOCUMENTS

| 5,959,443 | A  | * | 9/1999 | Littlefield .................... 323/287 |
| 7,400,118 | B1 | * | 7/2008 | Zhang et al. .................. 323/222 |
| 8,300,441 | B2 | * | 10/2012 | Charych ......................... 363/98 |
| 2003/0231009 | A1 | * | 12/2003 | Nemoto et al. ............... 323/276 |
| 2004/0056642 | A1 | * | 3/2004 | Nebrigic et al. ............... 323/284 |
| 2006/0209577 | A1 | * | 9/2006 | Hackner et al. ................. 363/39 |
| 2007/0018618 | A1 | * | 1/2007 | Endo ............................ 323/224 |

(Continued)

FOREIGN PATENT DOCUMENTS

| JP | 07-071805 A | 3/1995 |
| JP | 2003-079069 A | 3/2003 |

(Continued)

OTHER PUBLICATIONS

Japanese Office Action issued Dec. 3, 2013 in a corresponding Japanese Patent Application No. 2012-219125.

*Primary Examiner* — Timothy J Dole
*Assistant Examiner* — Yusef Ahmed
(74) *Attorney, Agent, or Firm* — Sughrue Mion, PLLC; Richard C. Turner

(57) ABSTRACT

A power supply device includes: a first switching element and a flywheel semiconductor element which are connected in series to a first DC power source in this order; and a reactor and a second DC power source which are connected in series in this order to a node between the first switching element and the flywheel semiconductor element. A second switching element and a charge circuit for charging a line between the first switching element and the second switching element are interposed between the reactor and the second DC power source. Abnormality of each element is determined from a voltage of each portion of the power supply device measured when the first and second switching elements and the flywheel semiconductor element are driven and controlled.

18 Claims, 9 Drawing Sheets

(56) References Cited

U.S. PATENT DOCUMENTS

| | | | |
|---|---|---|---|
| 2007/0035281 A1* | 2/2007 | Kuroiwa et al. | 323/222 |
| 2009/0302820 A1* | 12/2009 | Shimizu et al. | 323/285 |
| 2010/0039086 A1* | 2/2010 | De Stegge et al. | 323/282 |
| 2010/0320987 A1* | 12/2010 | Boling et al. | 323/284 |
| 2011/0285365 A1* | 11/2011 | de Cremoux et al. | 323/271 |
| 2012/0032664 A1* | 2/2012 | Coleman et al. | 323/311 |
| 2012/0098517 A1* | 4/2012 | Esumi et al. | 323/311 |
| 2012/0146602 A1* | 6/2012 | Chen et al. | 323/282 |
| 2014/0015503 A1* | 1/2014 | Cheng | 323/282 |

FOREIGN PATENT DOCUMENTS

| | | |
|---|---|---|
| JP | 2012-075207 A | 4/2012 |
| WO | 2010/032333 A1 | 3/2010 |

* cited by examiner

POWER SUPPLY DEVICE AND METHOD OF DETERMINING ABNORMALITY IN POWER SUPPLY DEVICE

BACKGROUND OF THE INVENTION

1. Field of the Invention

The present invention relates to a power supply device such as a DC-DC converter connected to a DC power source, and to a method of determining abnormality in a power supply device.

2. Description of the Related Art

For example, a conventional power supply device includes the following configuration (see, for example, Japanese Patent Application Laid-open No. 2012-75207). A chopper switching element for chopping an output current of the DC power source and a flywheel semiconductor element are connected to the DC power source in series in this order. A reactor L and a load circuit are connected in series in this order to a node between the chopper switching element and the flywheel semiconductor element. The power supply device further includes a drive circuit for controlling ON/OFF of the chopper switching element, a charge circuit connected to the node between the chopper switching element and the flywheel semiconductor element, an output voltage detection circuit for detecting a voltage between the reactor and the load circuit, and an abnormality determination circuit for determining abnormality based on a detection result of the output voltage detection circuit.

The charge circuit is driven under the state where the chopper switching element is turned OFF. When an output voltage detection value of the output voltage detection circuit is equal to or lower than a predetermined value, the abnormality determination circuit determines a failure, and inhibits normal operation of the power supply device, that is, inhibits ON/OFF control of the chopper switching element, to thereby prevent the extension of damage to other components of the power supply device.

In the conventional power supply device described above, in the case where the load circuit includes a second DC power source, the output voltage detection value of the output voltage detection circuit corresponds to a voltage of the second DC power source. Thus, it has been difficult to determine the presence and absence of a failure of the power supply device based on the detection value.

SUMMARY OF THE INVENTION

It is an object of the present invention to provide a power supply device and the like capable of determining the presence and absence of a failure of the power supply device even in the case of a power supply device including a first DC power source and a second DC power source which is provided on the load circuit side.

According to an exemplary embodiment of the present invention, there are provided a power supply device and the like, including: a first DC power source; a first switching element and a flywheel semiconductor element which are connected to the first DC power source in series in this order; a reactor, a second switching element, and a second DC power source which are connected in series in this order to a node between the first switching element and the flywheel semiconductor element; a drive control unit for driving the first switching element and the second switching element; a charge circuit for charging a first line between the first switching element and the second switching element; a first voltage detection circuit for detecting a line voltage of the first line; and an abnormality determination circuit for determining presence and absence of abnormality based on a control state of the drive control unit and a detection voltage of the first voltage detection circuit. The abnormality determination circuit determines that the flywheel semiconductor element is in a short-circuit failure state when the detection voltage of the first voltage detection circuit is lower than a predetermined voltage under a state where the drive control unit turns OFF the first switching element and the second switching element.

According to the power supply device of the present invention, it is possible to determine the presence and absence of a failure of the power supply device even in the case of the power supply device including the first DC power source and the second DC power source which is provided on the load circuit side.

DETAILED DESCRIPTION OF THE PREFERRED EMBODIMENTS

Referring to the accompanying drawings, a power supply device and the like according to the present invention are described below by way of embodiments. In the embodiments, the same or corresponding parts are denoted by the same reference symbols, and overlapping description is omitted.

First Embodiment

Figure 1:
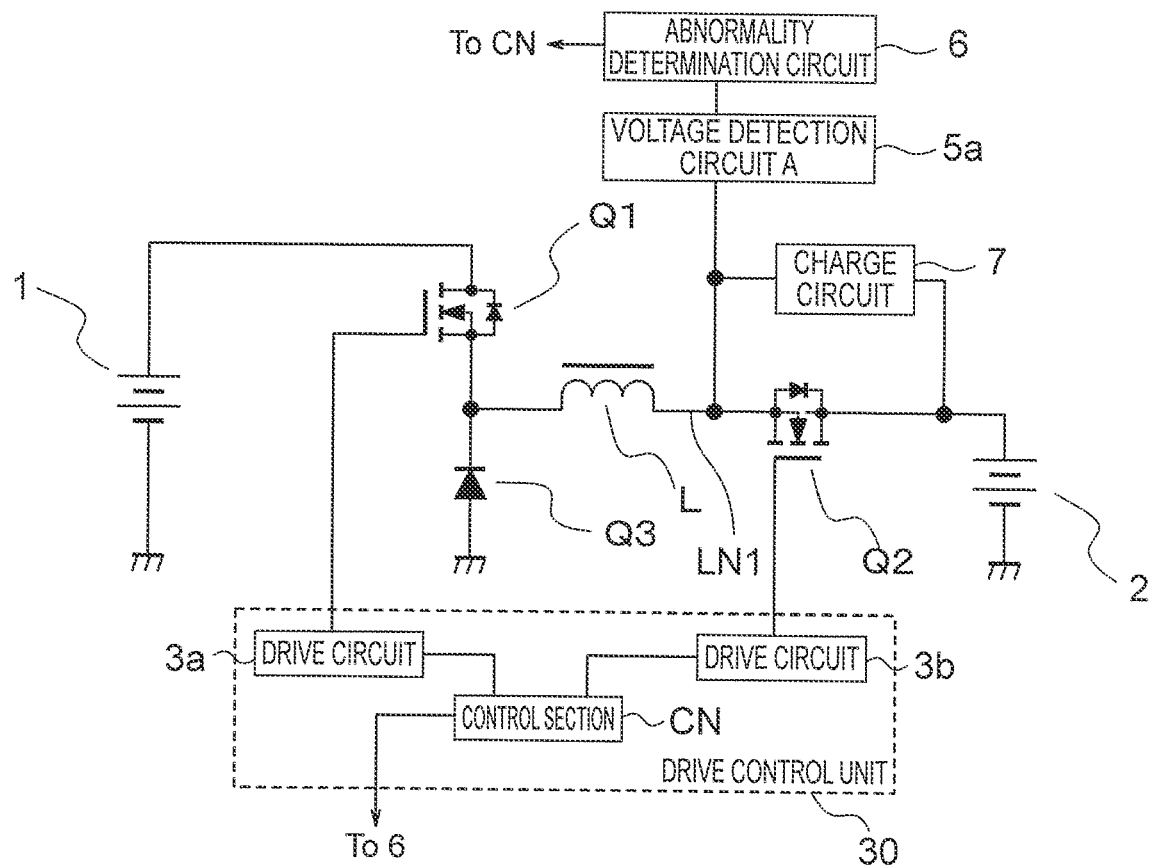
FIG. 1 is a configuration diagram of a power supply device according to a first embodiment of the present invention.

FIG. 1 illustrates a configuration of a power supply device according to a first embodiment of the present invention. In the power supply device in the first embodiment, a first switching element Q1 and a flywheel semiconductor element Q3 formed of a diode are connected in series in this order between a first DC power source 1 and, for example, the ground. A reactor L, a second switching element Q2, and a second DC power source 2 are connected in series in this order between a node between the first switching element Q1 and the flywheel semiconductor element Q3 and, for example, the ground.

The power supply device further includes drive circuits 3a and 3b for driving the first switching element Q1 and the second switching element Q2, respectively, a charge circuit 7 for charging a line LN1 (first line) including the reactor L and connecting between the first switching element Q1 and the second switching element Q2, a voltage detection circuit (A) 5a for detecting a line voltage of the line LN1 between the first switching element Q1 and the second switching element Q2, an abnormality determination circuit 6 for determining the presence and absence of abnormality in the power supply device based on a detection voltage of the voltage detection circuit (A) 5a, and a control section CN for controlling the drive circuits 3a and 3b and other components to control the whole power supply device. The drive circuits 3a and 3b and the control section CN form a drive control unit 30, which controls each switching element as described below.

The control section CN performs overall control on the first switching element Q1 and the second switching element Q2. The control section CN independently controls the presence and absence of drive signals output from the drive circuits 3a and 3b and the duty cycles thereof, to thereby control the driven/stop states of the first switching element Q1 and the second switching element Q2, the ON/OFF ratios thereof in the driven state, and the like. In this manner, the whole power supply device is controlled.

The abnormality determination circuit 6 transmits/receives a signal to/from the control section CN, and is capable of detecting the respective element states of the first switching element Q1 and the second switching element Q2 controlled by the control section CN and also capable of instructing the control section CN to control the switching elements Q1 and Q2.

Then, the drive signal is output from the drive circuit 3a so that an ON state for a predetermined period T1 and an OFF state for a predetermined period T2 may be alternately repeated in the first switching element Q1 (namely, a signal having a duty cycle of T1/(T1+T2)). In this manner, electric power is supplied by stepping down a voltage of the first DC power source 1 to a voltage of the second DC power source 2.

The control section CN controls the drive circuits 3a and 3b, and hence the first and second switching elements Q1 and Q2 are turned OFF before the normal operation where the first switching element Q1 is turned ON and OFF, for example. In this manner, the charge circuit 7 charges the line LN1 between the first switching element Q1 and the second switching element Q2. In this case, if the power supply device is normal, a detection voltage of the voltage detection circuit (A) 5a becomes equal to or higher than a predetermined voltage. However, if the flywheel semiconductor element Q3 has a short-circuit failure (fails to become an open-circuit state), sufficient charging cannot be performed by the charge circuit 7, with the result that the detection voltage becomes lower than the predetermined voltage.

The abnormality determination circuit 6 can determine that the flywheel semiconductor element Q3 has a short-circuit failure when the detection voltage of the voltage detection circuit (A) 5a is lower than the predetermined voltage. After the abnormality determination circuit 6 determines the abnormality, the abnormality determination circuit 6 transmits an abnormality signal to the control section CN. Then, for example, the drive circuit 3a does not output a drive signal, and the first switching element Q1 is not driven. Therefore, a failure of the flywheel semiconductor element Q3 can be determined before the normal operation of the power supply device is performed, that is, before the switching element Q1 is controlled to be turned ON and OFF. Thus, it is possible to prevent the extension of damage to other components of the power supply device.

Figure 9:
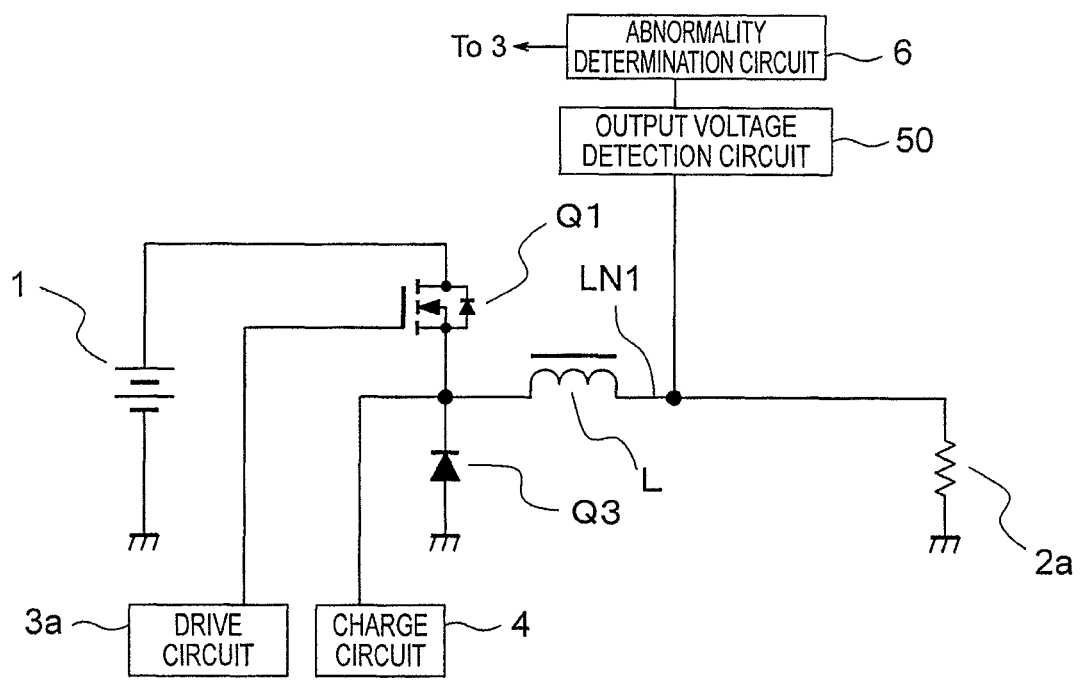
FIG. 9 is a configuration diagram of a conventional power supply device.

Note that, FIG. 9 illustrates an example of the configuration of the above-mentioned conventional power supply device. In the power supply device of FIG. 9, a charge circuit 4 is connected to a node between the first switching element Q1 and the flywheel semiconductor element Q3, and a load circuit 2a is connected to the reactor L instead of the second switching element Q2. In this configuration, if the load circuit 2a includes a DC power source, a short-circuit failure and the like of the flywheel semiconductor element Q3 cannot be determined.

Second Embodiment

Figure 2:
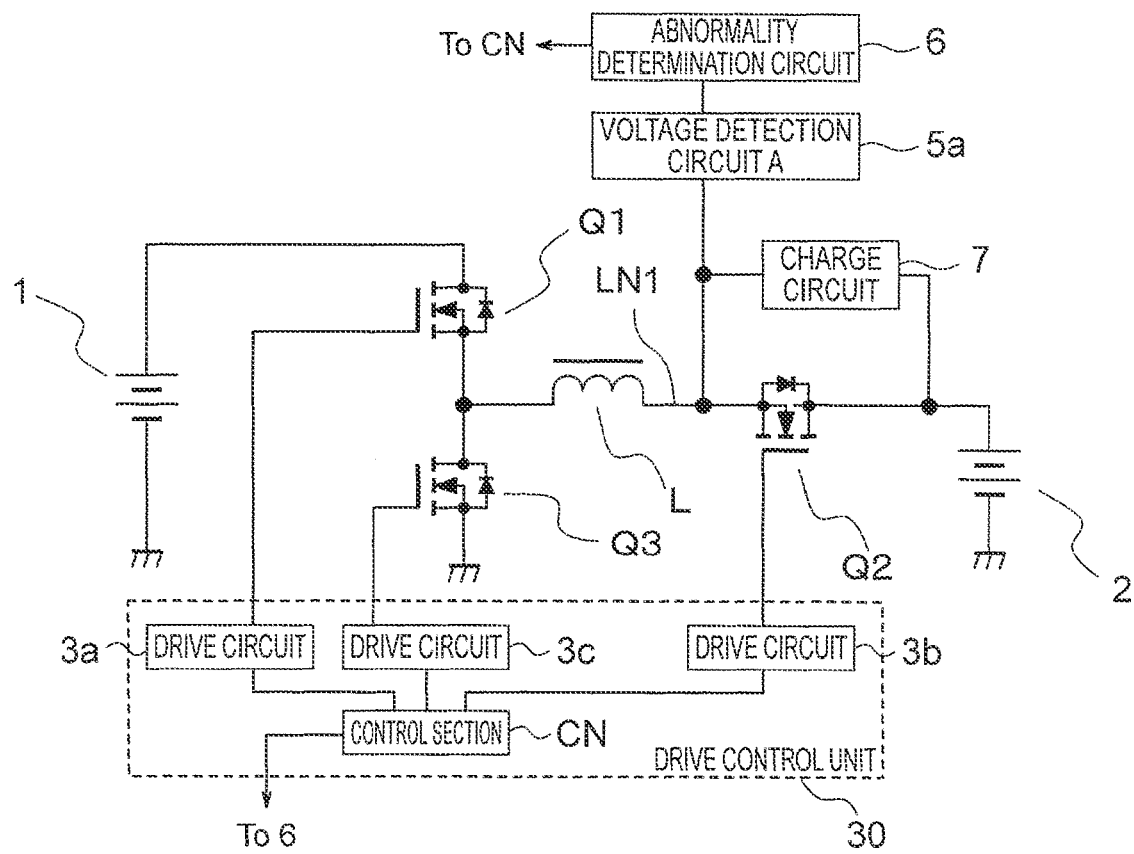
FIG. 2 is a configuration diagram of a power supply device according to a second embodiment of the present invention.

FIG. 2 illustrates a configuration of a power supply device according to a second embodiment of the present invention. The power supply device in the second embodiment is different from that in the first embodiment in that the flywheel semiconductor element Q3 is formed of a switching element (third switching element Q3) having a smaller conduction loss during ON operation than a diode and that a drive circuit 3c is added. With the flywheel semiconductor element Q3 formed of the switching element, drive signals are output from the drive circuits 3a and 3c of the drive control unit 30 so that an ON state for a predetermined period T1 and an OFF state for a predetermined period T2 may be alternately repeated in the first switching element Q1, that the switching element Q3 may be turned OFF while the first switching element Q1 is turned ON, and that the switching element Q3 may be turned ON while the first switching element Q1 is turned OFF. In this manner, electric power is supplied by stepping down the voltage of the first DC power source 1 to the voltage of the second DC power source 2.

The above-mentioned operation complicates the operation of the drive circuits 3a and 3c (control in the control section CN) as compared to the case where the flywheel semiconductor element Q3 is a diode, but can reduce a loss that occurs when a current flows through the switching element of the flywheel semiconductor element Q3. Thus, conversion efficiency of the power supply device can be improved.

Before the alternate ON/OFF operation of the first switching element Q1, the charge circuit 7 charges the line LN1 that connects between the first switching element Q1 and the second switching element Q2 under the state where the switching elements Q1, Q2, and Q3 are turned OFF. When a detection voltage of the voltage detection circuit (A) 5a is equal to or higher than a predetermined voltage, the switching element Q3 is turned ON next. In this case, if the switching element Q3 is normal, the detection voltage of the voltage detection circuit (A) 5a becomes lower than the predetermined voltage (because the voltage of the line LN1 reduces by the turned-ON switching element Q3). However, if the switching element Q3 has an open-circuit failure (fails to become a short-circuit (conductive) state), the detection voltage becomes equal to or higher than the predetermined voltage. Thus, the abnormality determination circuit 6 can determine that the switching element Q3 has an open-circuit failure.

Third Embodiment

Figure 3:
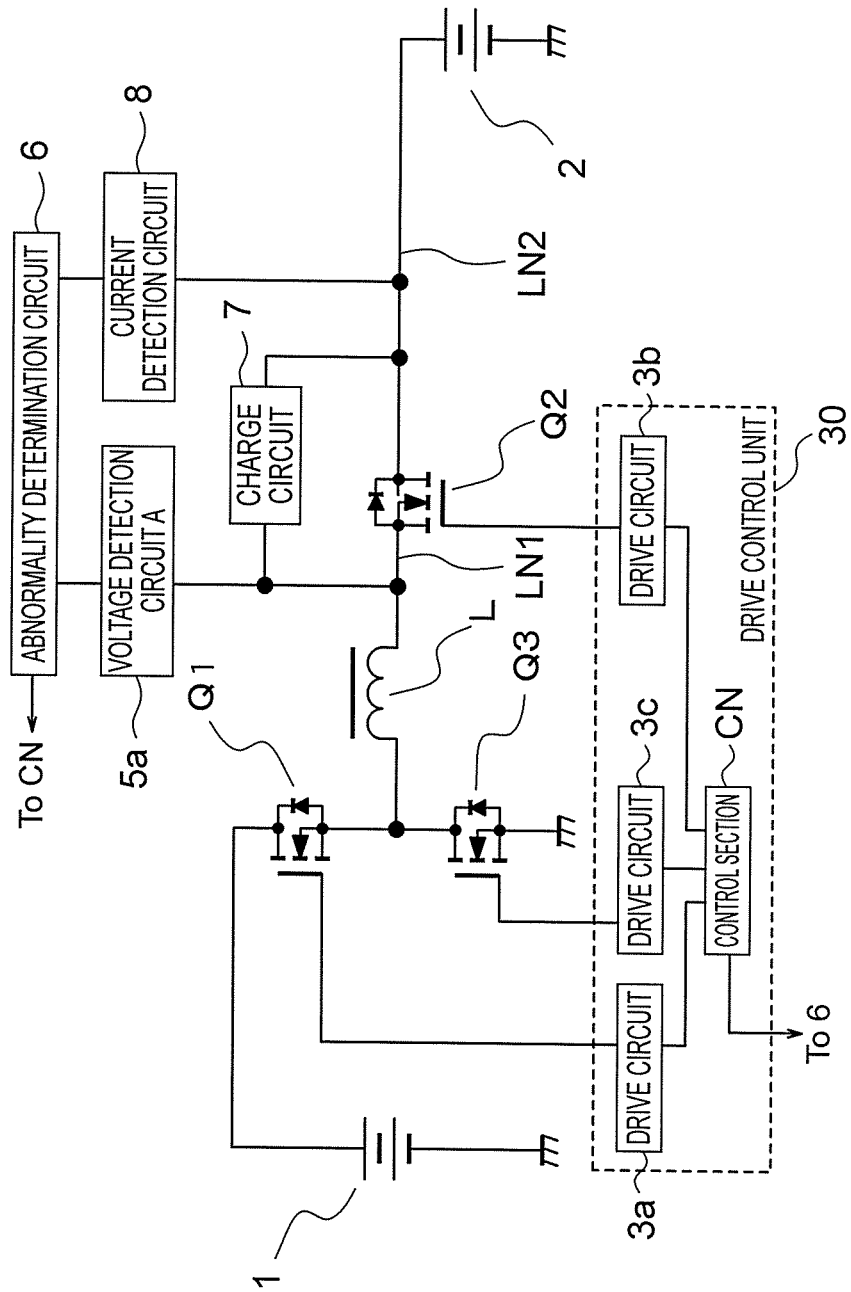
FIG. 3 is a configuration diagram of a power supply device according to a third embodiment of the present invention.

FIG. 3 illustrates a configuration of a power supply device according to a third embodiment of the present invention. The power supply device in the third embodiment is different from that in the second embodiment in that a current detection circuit 8 is provided on a line LN2 (second line) that connects between the reactor L and the second DC power source 2. The current detection circuit 8 is connected to the abnormality determination circuit 6. In the case where the second switching element Q2 is turned ON and the first switching element Q1 is turned ON and OFF under the state where at least one of the first and second switching elements Q1 and Q2 has an open-circuit failure, a detection current of the current detection circuit 8 becomes lower than a predetermined current. Thus, the abnormality determination circuit 6 can determine that the at least one of the first and second switching elements Q1 and Q2 is in an open-circuit failure state.

Fourth Embodiment

Figure 4:
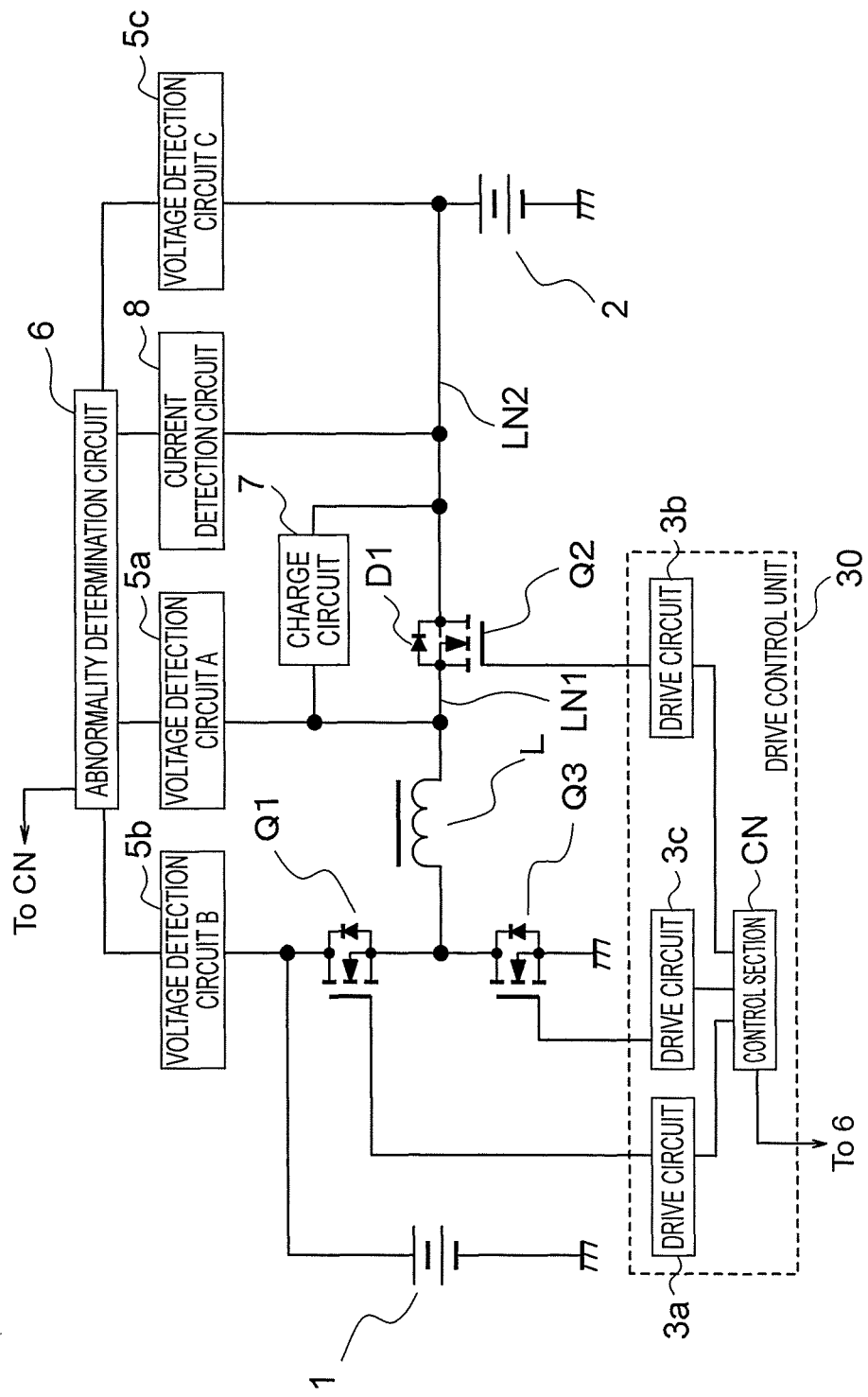
FIG. 4 is a configuration diagram of a power supply device according to a fourth embodiment of the present invention.

FIG. 4 illustrates a configuration of a power supply device according to a fourth embodiment of the present invention. The power supply device in the fourth embodiment is different from that in the third embodiment in that a second voltage detection circuit (B) 5b for detecting a voltage of the first DC power source 1 and a third voltage detection circuit (C) 5c for detecting a voltage of the second DC power source 2 are provided. In the case where the second switching element Q2 is turned ON and the first switching element Q1 is turned ON and OFF under the state where the first switching element Q1 has an open-circuit failure, a detection current of the current detection circuit 8 becomes lower than a predetermined current, and a detection voltage of the first voltage detection circuit (A) 5a substantially matches with the voltage of the second DC power source 2, namely a detection voltage of the third voltage detection circuit (C) 5c. Thus, the abnormality determination circuit 6 can determine that the first switching element Q1 is in an open-circuit failure state.

On the other hand, in the case where the second switching element Q2 is turned ON and the first switching element Q1 is turned ON and OFF under the state where the second switching element Q2 has an open-circuit failure, the detection current of the current detection circuit 8 becomes lower than the predetermined current, and the detection voltage of the first voltage detection circuit (A) 5a substantially matches with the voltage of the first DC power source 1, namely a detection voltage of the second voltage detection circuit (B) 5b. Thus, the abnormality determination circuit 6 can determine that the second switching element Q2 is in an open-circuit failure state.

A diode D1 having an anode terminal connected to the reactor L side and a cathode terminal connected to the second DC power source 2 side is provided in parallel to the second switching element Q2. For example, the second switching element Q2 and the diode D1 are formed of a MOSFET having a body diode. In this configuration, in the case where the second switching element Q2 is turned ON and the first switching element Q1 is turned ON and OFF under the state where the second switching element Q2 has an open-circuit failure, a current flows to the second DC power source 2 via the diode D1 to cause a voltage drop by Vf of the diode D1. Accordingly, a detection voltage of the first voltage detection circuit (A) 5a becomes higher by Vf than the voltage of the second DC power source 2, namely a detection voltage of the third voltage detection circuit (C) 5c. Thus, the abnormality determination circuit 6 can determine that the second switching element Q2 is in an open-circuit failure state.

Fifth Embodiment

Figure 5:
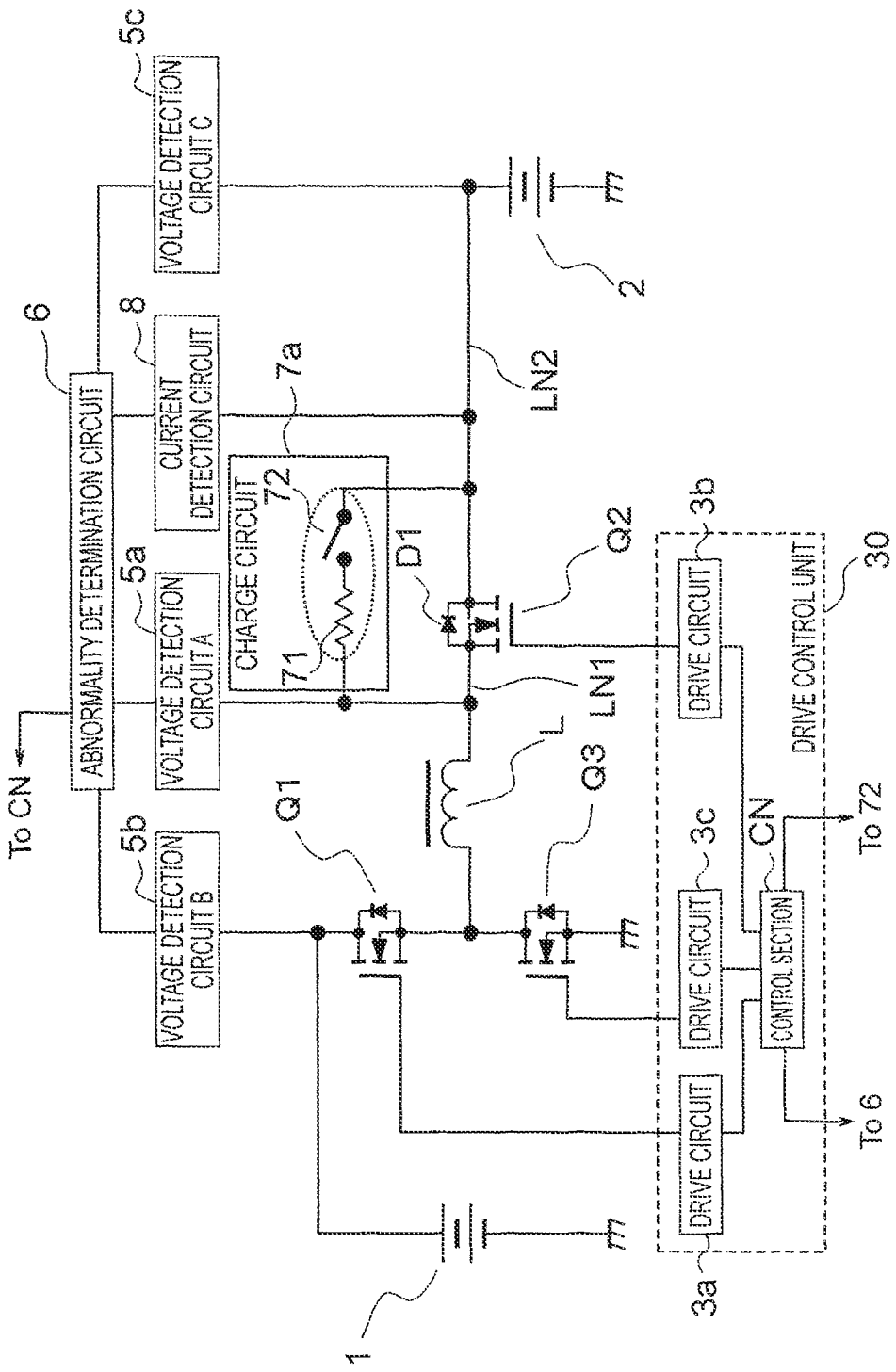
FIG. 5 is a configuration diagram of a power supply device according to a fifth embodiment of the present invention.

FIG. 5 illustrates a configuration of a power supply device according to a fifth embodiment of the present invention. The power supply device in the fifth embodiment is different from that in the fourth embodiment in that a charge circuit 7a is formed of a resistor 71 and a switch 72 such as a semiconductor switch. Even in the case where the first and second switching elements Q1 and Q2 and the semiconductor switch 72 of the charge circuit 7a are turned OFF under the state where at least one of the first and second switching elements Q1 and Q2 has a short-circuit failure, a detection voltage of the first voltage detection circuit (A) 5a becomes equal to or higher than a predetermined voltage. Thus, the abnormality determination circuit 6 can determine that the at least one of the first switching element Q1 and the second switching element Q2 is in a short-circuit failure state. Therefore, a failure of the at least one of the first switching element Q1 and the second switching element Q2 can be determined before the normal operation of the power supply device is performed, that is, before the switching element Q1 is controlled to be turned ON and OFF. Thus, it is possible to prevent the extension of damage to other components of the power supply device.

Note that, the semiconductor switch 72 of the charge circuit 7a is controlled by the control section CN of the drive control unit 30 similarly to the other switching elements.

On the other hand, in the case where the first and second switching elements Q1 and Q2 and the semiconductor switch 72 of the charge circuit 7a are turned OFF under the state where the first switching element Q1 has a short-circuit failure, a detection voltage of the first voltage detection circuit (A) 5a substantially matches with the voltage of the first DC power source 1, namely a detection voltage of the second voltage detection circuit (B) 5b. Thus, the abnormality determination circuit 6 can determine that the first switching element Q1 is in a short-circuit failure state.

On the other hand, in the case where the first and second switching elements Q1 and Q2 and the semiconductor switch 72 of the charge circuit 7a are turned OFF under the state where the second switching element Q2 has a short-circuit failure, a detection voltage of the first voltage detection circuit (A) 5a substantially matches with the voltage of the second DC power source 2, namely a detection voltage of the third voltage detection circuit (C) 5c. Thus, the abnormality determination circuit 6 can determine that the second switching element Q2 is in a short-circuit failure state.

A diode D1 having an anode terminal connected to the reactor L side and a cathode terminal connected to the second DC power source 2 side is provided in parallel to the second switching element Q2. For example, the second switching element Q2 and the diode D1 are formed of a MOSFET having a body diode. In this configuration, even in the case where the first and second switching elements Q1 and Q2 and the semiconductor switch 72 of the charge circuit 7a are turned OFF under the state where the first switching element Q1 has a short-circuit failure, a current flows to the second DC power source 2 via the diode D1 to cause a voltage drop by Vf of the diode D1. Accordingly, a detection voltage of the first voltage detection circuit (A) 5a becomes higher by Vf than the voltage of the second DC power source 2, namely a detection voltage of the third voltage detection circuit (C) 5c. Thus, the abnormality determination circuit 6 can determine that the first switching element Q1 is in a short-circuit failure state.

Sixth Embodiment

Figure 6:
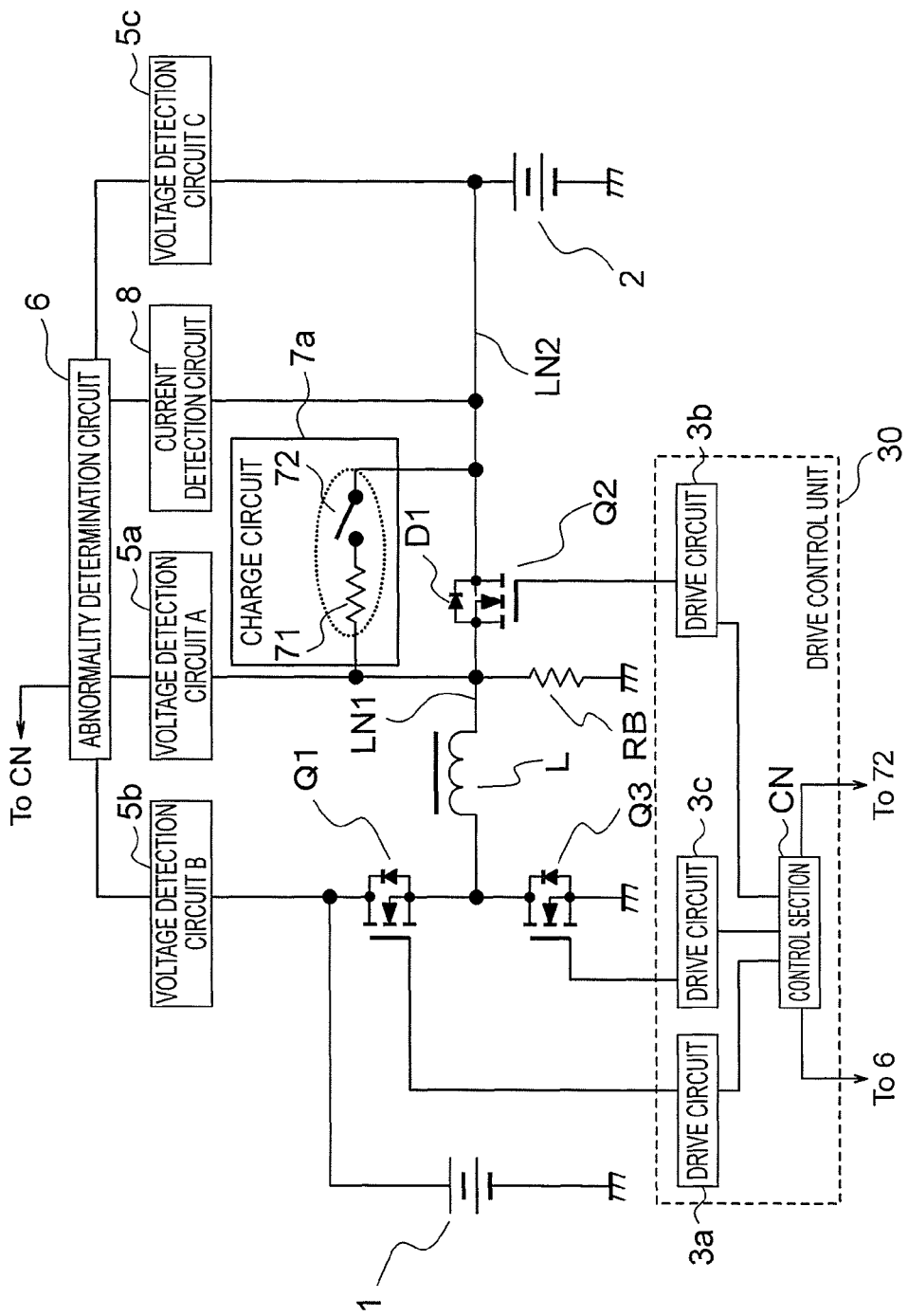
FIG. 6 is a configuration diagram of a power supply device according to a sixth embodiment of the present invention.

FIG. 6 illustrates a configuration of a power supply device according to a sixth embodiment of the present invention. The power supply device in the sixth embodiment is different from that in the fifth embodiment in that a ground resistor RB having one end connected to the line LN1 between the first switching element Q1 and the second switching element Q2 and the other terminal connected to the ground is provided.

By providing the ground resistor RB, a detection potential of the first voltage detection circuit (A) 5a is prevented from being indefinite when the charge circuit 7a turns OFF the charging of the line LN1 between the first switching element Q1 and the second switching element Q2. Thus, the detection potential can be reduced swiftly to the ground potential, and determination accuracy of the abnormality determination circuit 6 can be improved. In this case, it is necessary to set a resistance value rb of the ground resistor RB so as to be sufficiently larger than a resistance value measured in a short-circuit failure state of the flywheel semiconductor element Q3 and so that the voltage of the line LN1 between the first switching element Q1 and the second switching element Q2 measured in a charged state of the charge circuit 7a may be equal to or higher than a predetermined voltage.

Seventh Embodiment

Figure 7:
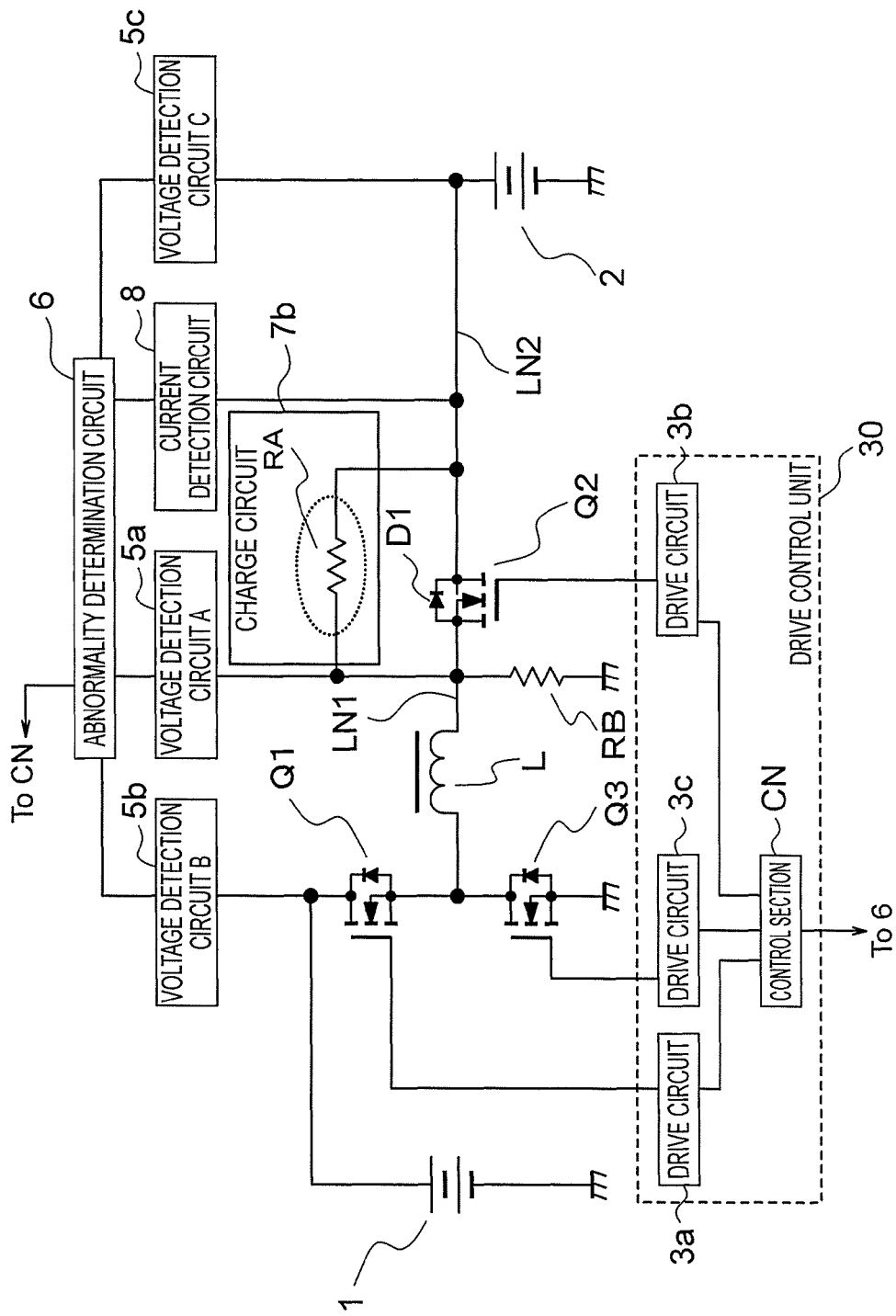
FIG. 7 is a configuration diagram of a power supply device according to a seventh embodiment of the present invention.

FIG. 7 illustrates a configuration of a power supply device according to a seventh embodiment of the present invention. The power supply device in the seventh embodiment is different from that in the sixth embodiment in that a charge circuit 7b is formed of a charge resistor RA having one end connected to the line LN1 side between the first switching element Q1 and the second switching element Q2 and the other end connected to the second DC power source 2 side. A resistance value ra of the charge resistor RA and the resistance value rb of the ground resistor RB are set to be values satisfying the following expression:

$$V1 > V2 \times (rb/(ra+rb))$$

where V1 represents the voltage of the first DC power source 1 and V2 represents the voltage of the second DC power source 2.

Even in the case where the first and second switching elements Q1 and Q2 are turned OFF under the state where at least one of the first switching element Q1 and the second switching element Q2 has a short-circuit failure, a detection voltage of the first voltage detection circuit (A) 5a becomes higher than V2×(rb/(ra+rb)). Thus, the abnormality determination circuit 6 can determine that the at least one of the first switching element Q1 and the second switching element Q2 is in a short-circuit failure state. Therefore, a failure of the at least one of the first switching element Q1 and the second switching element Q2 can be determined before the normal operation of the power supply device is performed, that is, before the switching element Q1 is controlled to be turned ON and OFF. Thus, it is possible to prevent the extension of damage to other components of the power supply device.

On the other hand, in the state where the first switching element Q1 has a short-circuit failure, a detection voltage of the first voltage detection circuit (A) 5a substantially matches with the voltage of the first DC power source 1, namely a detection voltage of the second voltage detection circuit (B) 5b. Thus, the abnormality determination circuit 6 can determine that the first switching element Q1 is in a short-circuit failure state. In the state where the second switching element Q2 has a short-circuit failure, the detection voltage of the first voltage detection circuit (A) 5a substantially matches with the voltage of the second DC power source 2, namely a detection voltage of the third voltage detection circuit (C) 5c. Thus, the abnormality determination circuit 6 can determine that the second switching element Q2 is in a short-circuit failure state.

A diode D1 having an anode terminal connected to the reactor L side and a cathode terminal connected to the second DC power source 2 side is provided in parallel to the second switching element Q2. For example, the second switching element Q2 and the diode D1 are formed of a MOSFET having a body diode. In this configuration, even in the case where the first and second switching elements Q1 and Q2 are turned OFF under the state where the first switching element Q1 has an short-circuit failure, a current flows to the second DC power source 2 via the diode D1 to cause a voltage drop by Vf of the diode D1. Accordingly, a detection voltage of the first voltage detection circuit (A) 5a becomes higher by Vf than the voltage of the second DC power source 2, namely a detection voltage of the third voltage detection circuit (C) 5c. Thus, the abnormality determination circuit 6 can determine that the first switching element Q1 is in a short-circuit failure state.

Eighth Embodiment

Figure 8:
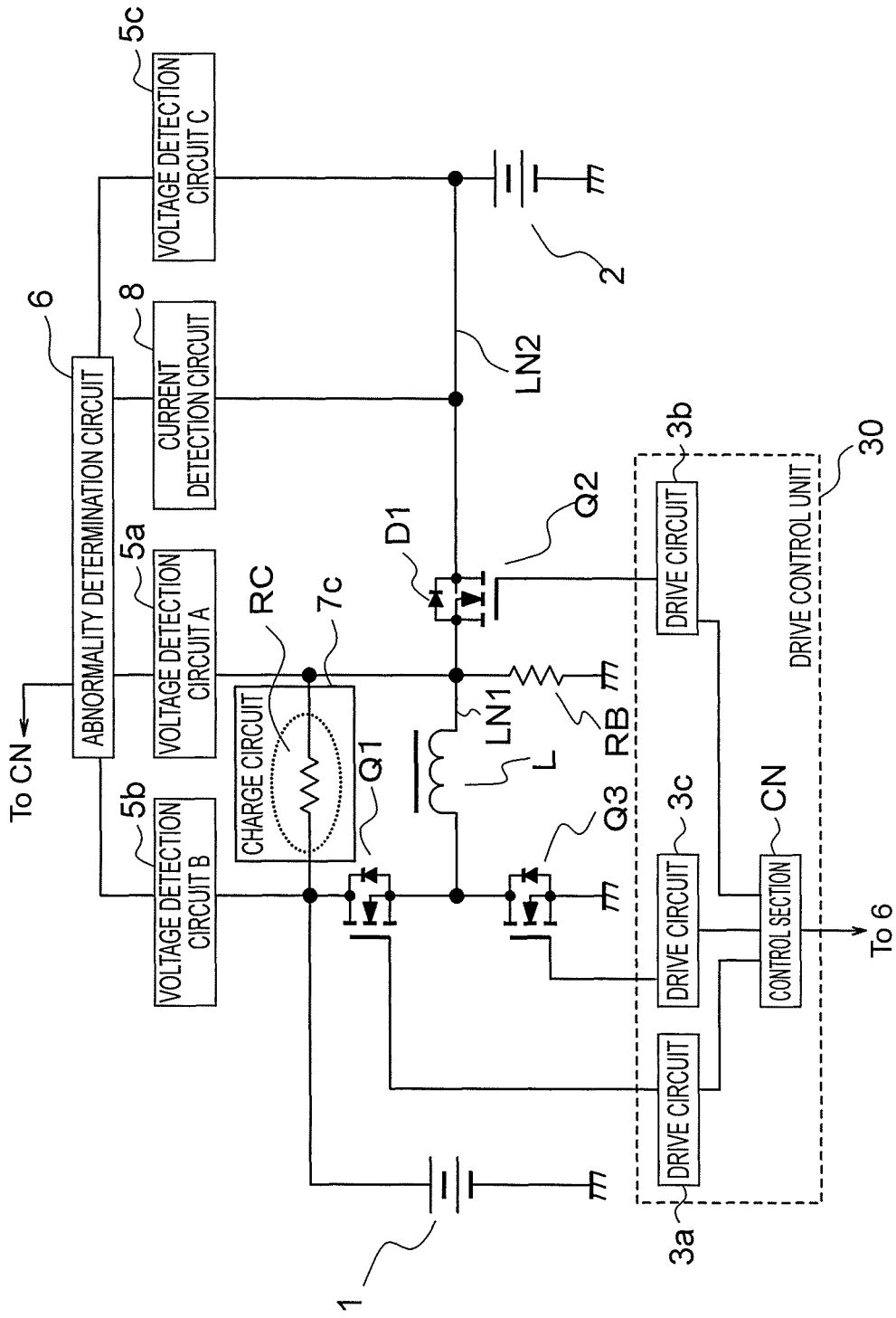
FIG. 8 is a configuration diagram of a power supply device according to an eighth embodiment of the present invention.

FIG. 8 illustrates a configuration of a power supply device according to an eighth embodiment of the present invention. The power supply device in the eighth embodiment is different from that in the seventh embodiment in that a charge circuit 7c is formed of a charge resistor RC having one end connected to the line LN1 side between the first switching element Q1 and the second switching element Q2 and the other end connected to the first second DC power source 1 side. A resistance value rc of the charge resistor RC and the resistance value rb of the ground resistor RB are set to be values satisfying the following expression:

$$V2 > V1 \times (rb/(rc+rb))$$

where V1 represents the voltage of the first DC power source 1 and V2 represents the voltage of the second DC power source 2.

Even in the case where the first and second switching elements Q1 and Q2 are turned OFF under the state where at least one of the first switching element Q1 and the second switching element Q2 has a short-circuit failure, a detection voltage of the first voltage detection circuit (A) 5a becomes higher than V1×(rb/(rc+rb)). Thus, the abnormality determination circuit 6 can determine that the at least one of the first switching element Q1 and the second switching element Q2 is in a short-circuit failure state. Therefore, a failure of the at least one of the first switching element Q1 and the second switching element Q2 can be determined before the normal operation of the power supply device is performed, that is, before the switching element Q1 is controlled to be turned ON and OFF. Thus, it is possible to prevent the extension of damage to other components of the power supply device.

On the other hand, in the state where the first switching element Q1 has a short-circuit failure, a detection voltage of the first voltage detection circuit (A) 5a substantially matches with the voltage of the first DC power source 1, namely a detection voltage of the second voltage detection circuit (B) 5b. Thus, the abnormality determination circuit 6 can determine that the first switching element Q1 is in a short-circuit failure state. In the state where the second switching element Q2 has a short-circuit failure, the detection voltage of the first voltage detection circuit (A) 5a substantially matches with the voltage of the second DC power source 2, namely a detection voltage of the third voltage detection circuit (C) 5c. Thus, the abnormality determination circuit 6 can determine that the second switching element Q2 is in a short-circuit failure state.

A diode D1 having an anode terminal connected to the reactor L side and a cathode terminal connected to the second DC power source 2 side is provided in parallel to the second switching element Q2. For example, the second switching element Q2 and the diode D1 are formed of a MOSFET having a body diode. In this configuration, even in the case where the first and second switching elements Q1 and Q2 are turned OFF under the state where the first switching element Q1 has an short-circuit failure, a current flows to the second DC power source 2 via the diode D1 to cause a voltage drop by Vf of the diode D1. Accordingly, a detection voltage of the first voltage detection circuit (A) 5a becomes higher by Vf than the voltage of the second DC power source 2, namely a detection voltage of the third voltage detection circuit (C) 5c. Thus, the abnormality determination circuit 6 can determine that the first switching element Q1 is in a short-circuit failure state.

It should be understood that the present invention is not limited to the above-mentioned embodiments but encompasses all possible combinations thereof. A failure portion and a failure mode can be specified by a combination of the abnormality determinations described in the above-mentioned embodiments.

According to the present invention, in the power supply device including the first DC power source and the second DC power source which is provided on the load circuit side, the presence and absence of a failure of the power supply device is determined particularly before the normal operation of the power supply device is performed, that is, before the chopper switching element is controlled to be turned ON and OFF. Thus, the present invention can provide a power supply device capable of preventing the extension of damage to other components in the power supply device.

What is claimed is:

1. A power supply device, comprising:
    a first DC power source;
    a first switching element and a flywheel semiconductor element which are respectively connected to the first DC power source in series;
    a reactor, a second switching element, and a second DC power source which are respectively connected in series to a node between the first switching element and the flywheel semiconductor element;
    a drive control unit for driving the first switching element and the second switching element;
    a charge circuit for charging a first line connected between the second switching element and the reactor;
    a first voltage detection circuit for detecting a line voltage of the first line;
    an abnormality determination circuit for determining presence and absence of abnormality based on a control state of the drive control unit and a detection voltage of the first voltage detection circuit;
    a second voltage detection circuit for detecting a voltage of the second DC power source; and
    a diode connected in parallel to the second switching element, the diode including an anode terminal connected to the reactor side and a cathode terminal connected to the second DC power source side,
    wherein:
    the abnormality determination circuit determines that the flywheel semiconductor element is in a short-circuit failure state when the detection voltage of the first voltage detection circuit is lower than a predetermined voltage under a state where the drive control unit turns OFF the first switching element and the second switching element,
    the charge circuit comprises a resistor and a switch,
    when the detection voltage of the first voltage detection circuit is equal to or higher than a predetermined voltage under a state where the drive control unit turns OFF the first switching element, the second switching element, and the switch of the charge circuit, the abnormality determination circuit determines that at least one of the first switching element and the second switching element is in a short-circuit failure state, and
    when the detection voltage of the first voltage detection circuit is higher than a detection voltage of the second voltage detection circuit by a voltage drop of the diode under a state where the drive control unit turns OFF the first switching element, the second switching element, and the switch of the charge circuit, the abnormality determination circuit determines that the first switching element is in a short-circuit failure state.

2. The power supply device according to claim 1, wherein the flywheel semiconductor element comprises a third switching element.

3. The power supply device according to claim 2, wherein the abnormality determination circuit determines that the third switching element is in an open-circuit failure state when the detection voltage of the first voltage detection circuit is equal to or higher than a predetermined voltage under a state where, when the detection voltage of the first voltage detection circuit is equal to or higher than the predetermined voltage, the drive control unit turns OFF the first switching element and the second switching element and turns ON the third switching element.

4. The power supply device according to claim 1, further comprising a current detection circuit for detecting a current flowing through a second line between the reactor and the second DC power source,
    wherein, when a detection current of the current detection circuit is lower than a predetermined current under a state where the drive control unit turns ON the second switching element and turns ON and OFF the first switching element, the abnormality determination circuit determines that at least one of the first switching element and the second switching element is in an open-circuit failure state.

5. The power supply device according to claim 4, further comprising:
    a second voltage detection circuit for detecting a voltage of the second DC power source; and
    a diode connected in parallel to the second switching element, the diode including an anode terminal connected to the reactor side and a cathode terminal connected to the second DC power source side,
    wherein, when the detection voltage of the first voltage detection circuit is higher than a detection voltage of the second voltage detection circuit by a voltage drop of the diode under a state where the drive control unit turns ON the second switching element and turns ON and OFF the first switching element, the abnormality determination circuit determines that the second switching element is in an open-circuit failure state.

6. The power supply device according to claim 1, further comprising a ground resister including one end connected to the first line and another end connected to a ground.

7. The power supply device according to claim 1, wherein:
    the charge circuit comprises a first charge resistor including one end connected to the first line and another end connected to the second DC power source side;
    the power supply device further comprises a ground resistor including one end connected to the first line and another end connected to a ground;
    a resistance value ra of the first charge resistor and a resistance value rb of the ground resistor are set to values satisfying the following expression, $$V1 > V2 \times (rb/(ra+rb))$$

where V1 represents a voltage of the first DC power source and V2 represents a voltage of the second DC power source; and
    when the detection voltage of the first voltage detection circuit is higher than $V2 \times (rb/(ra+rb))$ under a state where the drive control unit turns OFF the first switching element and the second switching element, the abnormality determination circuit determines at least one of the first switching element and the second switching element is in a short-circuit failure state.

8. The power supply device according to claim 7, further comprising:
    a second voltage detection circuit for detecting a voltage of the first DC power source; and a third voltage detection circuit for detecting a voltage of the second DC power source, wherein, when the detection voltage of the first voltage detection circuit substantially matches with a detection voltage of the second voltage detection circuit under a state where the drive control unit turns OFF the first switching element and the second switching element, the abnormality determination circuit determines that the first switching element is in a short-circuit failure state, and when the detection voltage of the first voltage detection circuit substantially matches with a detection voltage of the third voltage detection circuit, the abnormality determination circuit determines that the second switching element is in a short-circuit failure state.

9. The power supply device according to claim 7, further comprising:

a second voltage detection circuit for detecting a voltage of the second DC power source; and a diode connected in parallel to the second switching element, the diode including an anode terminal connected to the reactor side and a cathode terminal connected to the second DC power source side, wherein, when the detection voltage of the first voltage detection circuit is higher than a detection voltage of the second voltage detection circuit by a voltage drop of the diode under a state where the drive control unit turns OFF the first switching element, the second switching element, the abnormality determination circuit determines that the first switching element is in a short-circuit failure state.

10. The power supply device according to claim 1, wherein:

the charge circuit comprises a second charge resistor including one end connected to the first line and another end connected to the first DC power source side;

the power supply device further comprises a ground resistor including one end connected to the first line and another end connected to a ground;

a resistance value rc of the second charge resistor and a resistance value rb of the ground resistor are set to values satisfying the following expression, $$V2 > V1 \times (rb/(rc+rb))$$

where V1 represents a voltage of the first DC power source and V2 represents a voltage of the second DC power source; and when the detection voltage of the first voltage detection circuit is higher than $V1 \times (rb/(rc+rb))$ under a state where the drive control unit turns OFF the first switching element and the second switching element, the abnormality determination circuit determines at least one of the first switching element and the second switching element is in a short-circuit failure state.

11. The power supply device according to claim 10, further comprising:

a second voltage detection circuit for detecting a voltage of the first DC power source; and a third voltage detection circuit for detecting a voltage of the second DC power source, wherein, when the detection voltage of the first voltage detection circuit substantially matches with a detection voltage of the second voltage detection circuit under a state where the drive control unit turns OFF the first switching element and the second switching element, the abnormality determination circuit determines that the first switching element is in a short-circuit failure state, and when the detection voltage of the first voltage detection circuit substantially matches with a detection voltage of the third voltage detection circuit, the abnormality determination circuit determines that the second switching element is in a short-circuit failure state.

12. The power supply device according to claim 10, further comprising:

a second voltage detection circuit for detecting a voltage of the second DC power source; and a diode connected in parallel to the second switching element, the diode including an anode terminal connected to the reactor side and a cathode terminal connected to the second DC power source side, wherein, when the detection voltage of the first voltage detection circuit is higher than a detection voltage of the second voltage detection circuit by a voltage drop of the diode under a state where the drive control unit turns OFF the first switching element, the second switching element, and the switch of the charge circuit, the abnormality determination circuit determines that the first switching element is in a short-circuit failure state.

13. The power supply device according to claim 1, wherein a first end of the charge circuit is connected between the reactor and the second switching element and a second end of the charge circuit is connected between the second switching element and the second DC power source.

14. The power supply device according to claim 1, wherein a first end of the charge circuit is connected between the reactor and the second switching element and a second end of the charge circuit is connected to the first DC power source.

15. A power supply device, comprising:

a first DC power source;

a first switching element and a flywheel semiconductor element which are respectively connected to the first DC power source in series;

a reactor, a second switching element, and a second DC power source which are respectively connected in series to a node between the first switching element and the flywheel semiconductor element;

a drive control unit for driving the first switching element and the second switching element;

a charge circuit for charging a first line between the first switching element and the second switching element;

a first voltage detection circuit for detecting a line voltage of the first line;

an abnormality determination circuit for determining presence and absence of abnormality based on a control state of the drive control unit and a detection voltage of the first voltage detection circuit; and a current detection circuit for detecting a current flowing through a second line between the reactor and the second DC power source, wherein the abnormality determination circuit determines that the flywheel semiconductor element is in a short-circuit failure state when the detection voltage of the first voltage detection circuit is lower than a predetermined voltage under a state where the drive control unit turns OFF the first switching element and the second switching element, wherein, when a detection current of the current detection circuit is lower than a predetermined current under a state where the drive control unit turns ON the second switching element and turns ON and OFF the first switching element, the abnormality determination circuit determines that at least one of the first switching element and the second switching element is in an open-circuit failure state, wherein the power supply device further comprises:
a second voltage detection circuit for detecting a voltage of the first DC power source; and
a third voltage detection circuit for detecting a voltage of the second DC power source, and
wherein, when the detection voltage of the first voltage detection circuit substantially matches with a detection voltage of the third voltage detection circuit under a state where the drive control unit turns ON the second switching element and turns ON and OFF the first switching element, the abnormality determination circuit determines that the first switching element is in an open-circuit failure state, and when the detection voltage of the first voltage detection circuit substantially matches with a detection voltage of the second voltage detection circuit, the abnormality determination circuit determines that the second switching element is in an open-circuit failure state.

16. A power supply device, comprising:
a first DC power source;
a first switching element and a flywheel semiconductor element which are respectively connected to the first DC power source in series;
a reactor a second switching element and a second DC power source which are respectively connected in series to a node between the first switching element and the flywheel semiconductor element;
a drive control unit for driving the first switching element and the second switching element;
a charge circuit for charging a first line between the first switching element and the second switching element;
a first voltage detection circuit for detecting a line voltage of the first line;
an abnormality determination circuit for determining presence and absence of abnormality based on a control state of the drive control unit and a detection voltage of the first voltage detection circuit;
a second voltage detection circuit for detecting a voltage of the first DC power source; and
a third voltage detection circuit for detecting a voltage of the second DC power source,
wherein the abnormality determination circuit determines that the flywheel semiconductor element is in a short-circuit failure state when the detection voltage of the first voltage detection circuit is lower than a predetermined voltage under a state where the drive control unit turns OFF the first switching element and the second switching element,
wherein the charge circuit comprises a resistor and a switch,
wherein, when the detection voltage of the first voltage detection circuit is equal to or higher than a predetermined voltage under a state where the drive control unit turns OFF the first switching element, the second switching element, and the switch of the charge circuit, the abnormality determination circuit determines that at least one of the first switching element and the second switching element is in a short-circuit failure state, and
wherein, when the detection voltage of the first voltage detection circuit substantially matches with a detection voltage of the second voltage detection circuit under a state where the drive control unit turns OFF the first switching element, the second switching element, and the switch of the charge circuit, the abnormality determination circuit determines that the first switching element is in a short-circuit failure state, and when the detection voltage of the first voltage detection circuit substantially matches with a detection voltage of the third voltage detection circuit, the abnormality determination circuit determines that the second switching element is in a short-circuit failure state.

17. A power supply device, comprising:
a first switching element and a flywheel semiconductor element which are respectively connected in series to a first DC power source;
a reactor and a second DC power source which are respectively connected in series to a node between the first switching element and the flywheel semiconductor element;
a second switching element which is connected to the second DC power source and a charge circuit for charging a line between the first switching element and the second switching element, the second switching element and the charge circuit being interposed between the reactor and the second switching element;
an abnormality determination circuit for determining abnormality of each element from a voltage of each portion of the power supply device measured when the first switching element, the second switching element, and the flywheel semiconductor element are driven and controlled by a drive control unit;
a first voltage detection circuit for detecting a voltage of the line and a second voltage detection circuit for detecting a voltage of the second DC power source; and
a diode connected in parallel to the second switching element, the diode including an anode terminal connected to the reactor side and a cathode terminal connected to the second DC power source side,
wherein the charge circuit comprises a resistor and a switch,
wherein, when the detection voltage of the first voltage detection circuit is equal to or higher than a predetermined voltage under a state where the drive control unit turns OFF the first switching element, the second switching element, and the switch of the charge circuit, the abnormality determination circuit determines that at least one of the first switching element and the second switching element is in a short-circuit failure state, and
wherein, when the detection voltage of the first voltage detection circuit is higher than a detection voltage of the second voltage detection circuit by a voltage drop of the diode under a state where the drive control unit turns OFF the first switching element, the second switching element, and the switch of the charge circuit, the abnormality determination circuit determines that the first switching element is in a short-circuit failure state.

18. A method of determining abnormality in a power supply device,
the power supply device comprising:
a first switching element and a flywheel semiconductor element which are respectively connected in series to a first DC power source;
a reactor, a second switching element, and a second DC power source which are respectively connected in series to a node between the first switching element and the flywheel semiconductor element;
a charge circuit for charging a line connected between the second switching element and the reactor, wherein the charge circuit comprises a resistor and a switch;
a diode connected in parallel to the second switching element, the diode including an anode terminal connected to the reactor side and a cathode terminal connected to the second DC power source side; and a first voltage detection circuit, which is configured to detect a voltage of the line and a second voltage detection circuit, which is configured to detect a voltage of the second DC power source, the method comprising:
- interposing, between the reactor and the second DC power source, a second switching element and a charge circuit for charging a line between the first switching element and the second switching element such that the charging circuit is positioned between the second switching element and the reactor;
- determining abnormality of each element from a voltage of each portion of the power supply device measured when the first switching element, the second switching element, and the flywheel semiconductor element are driven and controlled;
- when the detection voltage of the first voltage detection circuit is equal to or higher than a predetermined voltage under a state where the drive control unit turns OFF the first switching element, determining, by the second switching element, the switch of the charge circuit, and the abnormality determination circuit, that at least one of the first switching element and the second switching element is in a short-circuit failure state, and
- when the detection voltage of the first voltage detection circuit is higher than a detection voltage of the second voltage detection circuit by a voltage drop of the diode under a state where the drive control unit turns OFF the first switching element, determining, by the second switching element, the switch of the charge circuit, and the abnormality determination circuit, that the first switching element is in a short-circuit failure state.

* * * * *